US008042121B2

(12) United States Patent
Harris et al.

(10) Patent No.: US 8,042,121 B2
(45) Date of Patent: Oct. 18, 2011

(54) METHODS AND SYSTEMS FOR BURNING COMPACT DISCS

(75) Inventors: Geoffrey Harris, Seattle, WA (US); Kathleen Demaree, Snohomish, WA (US); Phillip Lu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 2307 days.

(21) Appl. No.: 10/186,227

(22) Filed: Jun. 27, 2002

(65) Prior Publication Data
US 2003/0182471 A1 Sep. 25, 2003

Related U.S. Application Data

(60) Provisional application No. 60/366,388, filed on Mar. 21, 2002.

(51) Int. Cl.
*G06F 13/00* (2006.01)
(52) U.S. Cl. ......................................... 719/328; 715/716
(58) Field of Classification Search .................. 719/328; 715/716
See application file for complete search history.

(56) References Cited

U.S. PATENT DOCUMENTS

| 6,862,650 | B1* | 3/2005 | Matthews et al. ................. 711/6 |
| 6,920,565 | B2* | 7/2005 | Isaacson et al. ............... 713/193 |
| 6,993,773 | B2* | 1/2006 | Broussard ..................... 719/328 |
| 7,359,626 | B2* | 4/2008 | McMurdie et al. ............ 386/125 |
| 2002/0085461 | A1* | 7/2002 | Sugiyama .................. 369/47.12 |
| 2003/0011630 | A1* | 1/2003 | Knowlton et al. ............. 345/731 |
| 2007/0239849 | A1* | 10/2007 | Robbin et al. ................. 709/217 |

\* cited by examiner

*Primary Examiner* — Andy Ho
(74) *Attorney, Agent, or Firm* — Lee & Hayes, PLLC

(57) ABSTRACT

Various methods and systems provide a media player application that is integrated with CD burning functionality. In some embodiments, the CD burning functionality is accessed via a collection of application program interfaces (APIs) that are called by the media player application. The media player application and APIs can be incorporated within an operating system. Because of the integration between the media player application and the CD burning functionality, the user can be provided with a great deal of feedback during the CD burning process. In one embodiment, a user interface (UI) provides a single pane through which a user can access the media player application and its CD burning functionality. Feedback can be provided to the user via the single pane UI.

57 Claims, 14 Drawing Sheets

User interface indicates that the disc is being closed.

Track metadata for the newly burned CD is saved

METHODS AND SYSTEMS FOR BURNING COMPACT DISCS

RELATED APPLICATION

This application stems from and claims priority to U.S. Provisional Application Ser. No. 60/366,388, filed on Mar. 21, 2002, the disclosure of which is incorporated by reference herein.

TECHNICAL FIELD

This invention relates generally to methods and systems for burning compact discs (CDs).

BACKGROUND

Compact discs (CDs) have been and continue to be the primary way that people transport, share, and listen to music. As digital music becomes more and more popular, digital music users will be able to use digital music players and the Internet to accomplish these tasks. However, as broadband connections still represent a small percentage of households, CDs will continue to be an easy, low cost alternative.

In recent years, hardware for copying CDs, termed "CD burners", have become a popular way for people to transfer their digital music from a computer, such as a personal computer that contains their music library, to a portable CD. CD burners include a CD drive and hardware that enables digital data to be written to a CD that is inserted into the drive. So, to transfer songs from a computer to a new CD, a user need simply insert a blank CD into an appropriately configured CD drive and utilize a software application on their computer to initiate copying of the songs. In the past, however, the user experience provided by the CD burning systems has not been all that it could be. This stems from the fact that the means by which the CD burning functionality is accessed is not one that lends itself to a robust user experience. As an example, consider FIG. 1.

FIG. 1 illustrates a typical system that has enabled CD burning in the past. This system includes a media player application 100 through which a user interfaces with media on their computer. Typically, to burn CDs, the media player application launches a third party burning application 102 which installs its own layer of software 104. Layer 104 communicates with the hardware drive 106 to facilitate burning. In this scenario, after media player application 100 launches the third party burning application 102, it is no longer involved in the burning process. This is undesirable for a number of different reasons.

For example, the FIG. 1 scenario typically does not provide the user with meaningful and timely information or feedback on the progress and status of the CD burning process. For example, in the past, if the user selected a playlist of songs to burn to the CD and the list was too long, the user would not discover this information until after the third party application received the playlist and attempted to burn it to the CD. The third party application would typically generate an error message which would then cause the user to go back and shorten their playlist. This, however, took place after the user believed that they had initiated the burning process. So, for example, if the user initiated the burning process and left the computer, they would not know that the songs had not been transferred until they returned to the computer.

Additionally, because of the loose association of media player application 100 and third party burning application 102, the media player application typically does not know whether there is a CD drive with burning capabilities on its associated machine. The result of this is that the media player application will appear to the user as if it supports burning capabilities when, in fact, it does not. The media player application then relies on the third party burning application to generate an error message when the user attempts to burn a CD on a system that does not in fact support burning.

Thus, in the past, systems for burning CDs have not provided a user experience that is as desirable as it might be. Accordingly, this invention arose out of concerns associated with providing improved systems and methods for burning CDs and particularly, those that greatly enhance the user's burning experience.

SUMMARY

Various methods and systems provide a media player application that is integrated with CD burning functionality. In some embodiments, the CD burning functionality is accessed via a collection of application program interfaces (APIs) that are called by the media player application. The media player application and APIs can be incorporated within an operating system. Because of the integration between the media player application and the CD burning functionality, the user can be provided with a great deal of feedback during the CD burning process.

In one embodiment, a user interface (UI) provides a single pane through which a user can access the media player application and its CD burning functionality. Feedback can be provided to the user via the single pane UI.

DETAILED DESCRIPTION

Overview

Various methods and systems provide a media player application that is integrated with CD burning functionality. In some embodiments, the CD burning functionality is accessed via a collection of application program interfaces (APIs) that are called by the media player application. The media player application and APIs can be incorporated within an operating system. Because of the integration between the media player application and the CD burning functionality, the user can be provided with a great deal of feedback during the CD burning process.

In one embodiment, a user interface (UI) provides a single pane through which a user can access the media player application and its CD burning functionality. Feedback can be provided to the user via the single pane UI.

Exemplary Computer Environment

Figure 1:
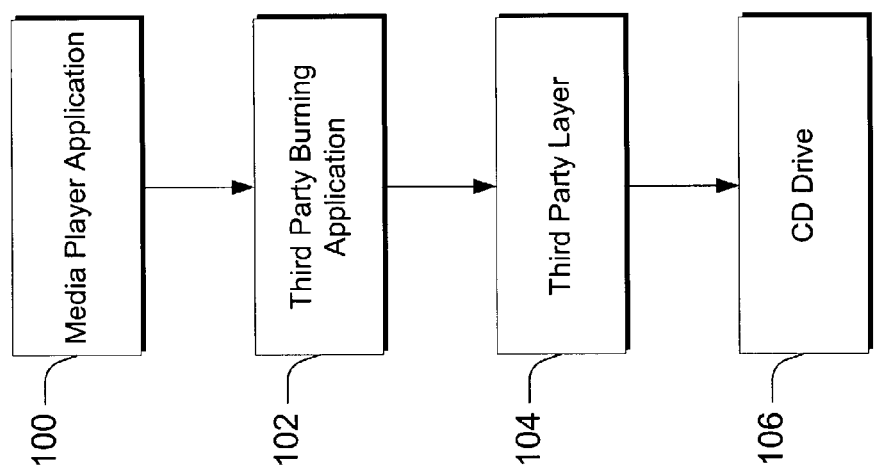
FIG. 1 is a block diagram that illustrates components of a prior art CD burning process.
Figure 2:
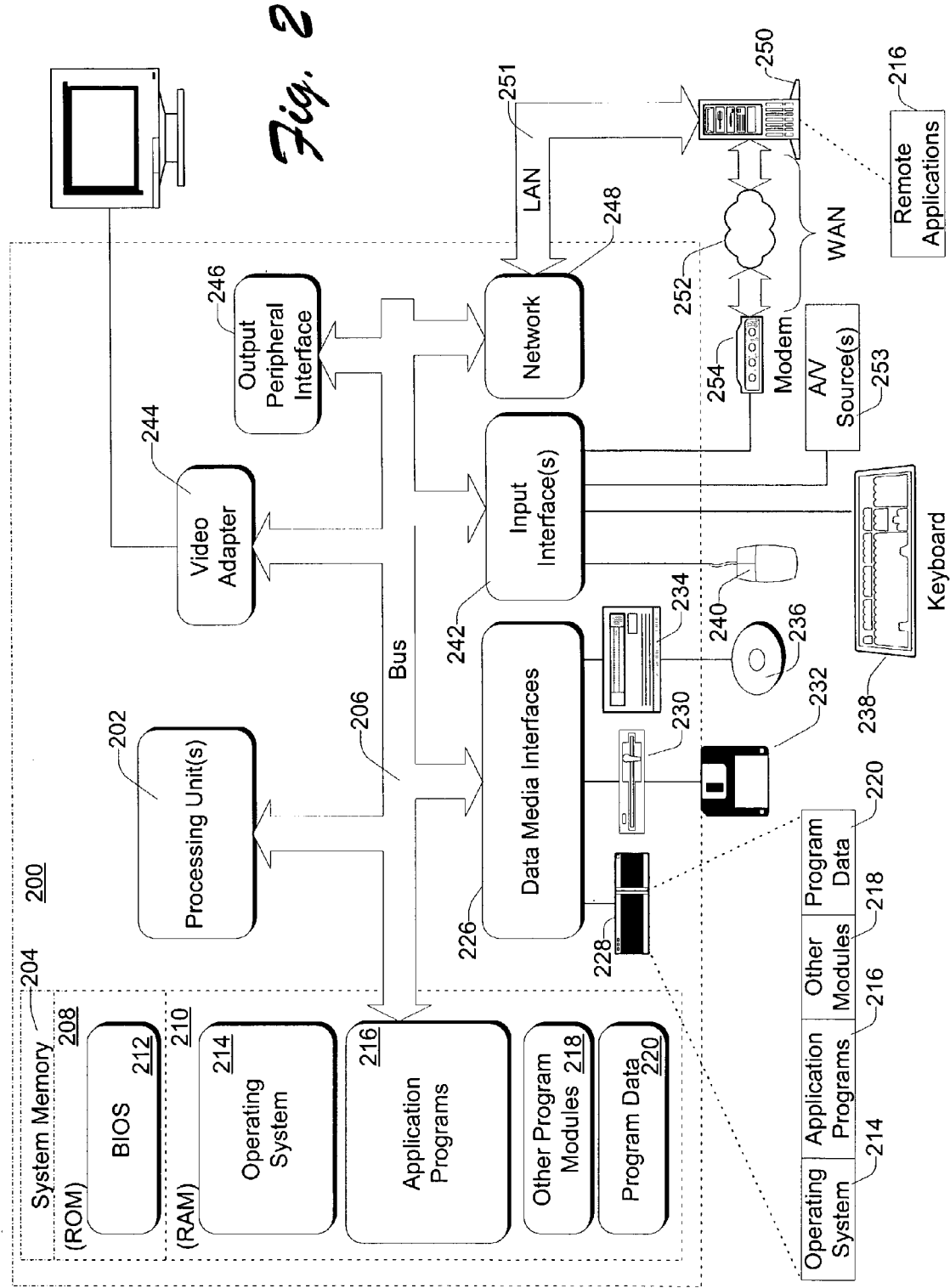
FIG. 2 is a block diagram of an exemplary computer system that can be utilized to implement one or more embodiments.

FIG. 2 illustrates an example of a suitable computing environment 200 on which the system and related methods described below can be implemented.

It is to be appreciated that computing environment 200 is only one example of a suitable computing environment and is not intended to suggest any limitation as to the scope of use or functionality of the media processing system. Neither should the computing environment 200 be interpreted as having any dependency or requirement relating to any one or combination of components illustrated in the exemplary computing environment 200.

The various described embodiments can be operational with numerous other general purpose or special purpose computing system environments or configurations. Examples of well known computing systems, environments, and/or configurations that may be suitable for use with the media processing system include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the system and related methods may well be described in the general context of computer-executable instructions, such as program modules, being executed by a computer. Generally, program modules include routines, programs, objects, components, data structures, etc. that perform particular tasks or implement particular abstract data types. The embodiments can also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 2, computing system 200 is shown comprising one or more processors or processing units 202, a system memory 204, and a bus 206 that couples various system components including the system memory 204 to the processor 202.

Bus 206 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 200 typically includes a variety of computer readable media. Such media may be any available media that is locally and/or remotely accessible by computer 200, and it includes both volatile and non-volatile media, removable and non-removable media.

In FIG. 2, the system memory 204 includes computer readable media in the form of volatile, such as random access memory (RAM) 210, and/or non-volatile memory, such as read only memory (ROM) 208. A basic input/output system (BIOS) 212, containing the basic routines that help to transfer information between elements within computer 200, such as during start-up, is stored in ROM 208. RAM 210 typically contains data and/or program modules that are immediately accessible to and/or presently be operated on by processing unit(s) 202.

Computer 200 may further include other removable/non-removable, volatile/non-volatile computer storage media. By way of example only, FIG. 2 illustrates a hard disk drive 228 for reading from and writing to a non-removable, non-volatile magnetic media (not shown and typically called a "hard drive"), a magnetic disk drive 230 for reading from and writing to a removable, non-volatile magnetic disk 232 (e.g., a "floppy disk"), and an optical disk drive 234 for reading from or writing to a removable, non-volatile optical disk 236 such as a CD-ROM, DVD-ROM or other optical media. The hard disk drive 228, magnetic disk drive 230, and optical disk drive 234 are each connected to bus 206 by one or more interfaces 226.

The drives and their associated computer-readable media provide nonvolatile storage of computer readable instructions, data structures, program modules, and other data for computer 200. Although the exemplary environment described herein employs a hard disk 228, a removable magnetic disk 232 and a removable optical disk 236, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 228, magnetic disk 232, optical disk 236, ROM 208, or RAM 210, including, by way of example, and not limitation, an operating system 214, one or more application programs 216 (e.g., multimedia application program 224), other program modules 218, and program data 220. A user may enter commands and information into computer 200 through input devices such as keyboard 238 and pointing device 240 (such as a "mouse"). Other input devices may include a audio/video input device(s) 253, a microphone, joystick, game pad, satellite dish, serial port, scanner, or the like (not shown). These and other input devices are connected to the processing unit(s) 202 through input interface(s) 242 that is coupled to bus 206, but may be connected by other interface and bus structures, such as a parallel port, game port, or a universal serial bus (USB).

A monitor 256 or other type of display device is also connected to bus 206 via an interface, such as a video adapter or video/graphics card 244. In addition to the monitor, personal computers typically include other peripheral output devices (not shown), such as speakers and printers, which may be connected through output peripheral interface 246.

Computer 200 may operate in a networked environment using logical connections to one or more remote computers, such as a remote computer 250. Remote computer 250 may include many or all of the elements and features described herein relative to computer.

As shown in FIG. 2, computing system 200 is communicatively coupled to remote devices (e.g., remote computer 250) through a local area network (LAN) 251 and a general wide area network (WAN) 252. Such networking environments are commonplace in offices, enterprise-wide computer networks, intranets, and the Internet.

When used in a LAN networking environment, the computer 200 is connected to LAN 251 through a suitable network interface or adapter 248. When used in a WAN networking environment, the computer 200 typically includes a modem 254 or other means for establishing communications over the WAN 252. The modem 254, which may be internal or external, may be connected to the system bus 206 via the user input interface 242, or other appropriate mechanism.

In a networked environment, program modules depicted relative to the personal computer 200, or portions thereof, may be stored in a remote memory storage device. By way of example, and not limitation, FIG. 2 illustrates remote application programs 216 as residing on a memory device of remote computer 250. It will be appreciated that the network connections shown and described are exemplary and other means of establishing a communications link between the computers may be used.

Exemplary Architecture

Figure 3:
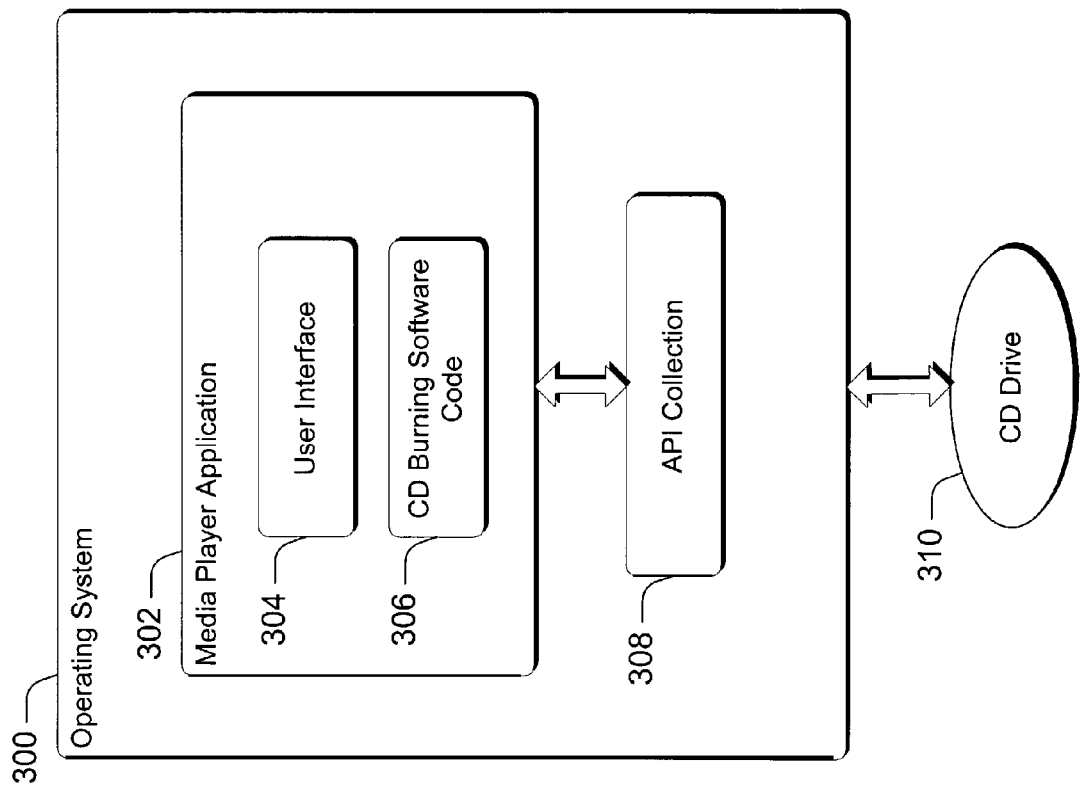
FIG. 3 is a block diagram that illustrates components of a computer architecture in accordance with one embodiment.

FIG. 3 illustrates an exemplary architecture that can be used to implement the inventive embodiments described herein. The illustrated architecture provides for a tight integration between a media player application and software code that facilitates CD burning. Because of this tight integration, the user is able to be provided with a much more robust collection of features and services, as will become apparent below.

In this example, an operating system 300 includes the various components that are used to burn CDs. By including such components as part of the operating system, tighter integration can be provided. Specifically, operating system 300 comprises a media player application 302 which, in turn, comprises a user interface 304 and CD burning software code or component 306. In the context of the description of the inventive embodiments, the term "media player application" is used to refer to a software application that comprises a "jukebox" application. A jukebox application is one that permits a user to, among other things, create, manage and/or play digital music. Typically, media player applications can include other functionalities as well such as one or more of: a CD player, DVD player, audio and video player, media guide, Internet radio, and in accordance with the inventive embodiments, a portable-device music-file transfer, and an audio CD recorder.

An exemplary user interface is shown and described below in the section entitled "Exemplary User Interface and Burn Process". The CD burning software code 306 comprises the software code within the media player application that enables the media player application to make the particular calls that it needs to make to facilitate the CD burning process. An API collection 308 is provided that includes a collection of methods that can be called by the media player application to facilitate CD burning. Thus, through the API collection 308, the media player application 302 is able to cause CDs to be burned via a CD drive 310.

A suitable example of a specific collection of APIs that can be used to burn CDs is provided by the assignee of this document as parts of its Windows implementation and is known as "IMAPI" or "Image Mastering APIs".

Figure 4:
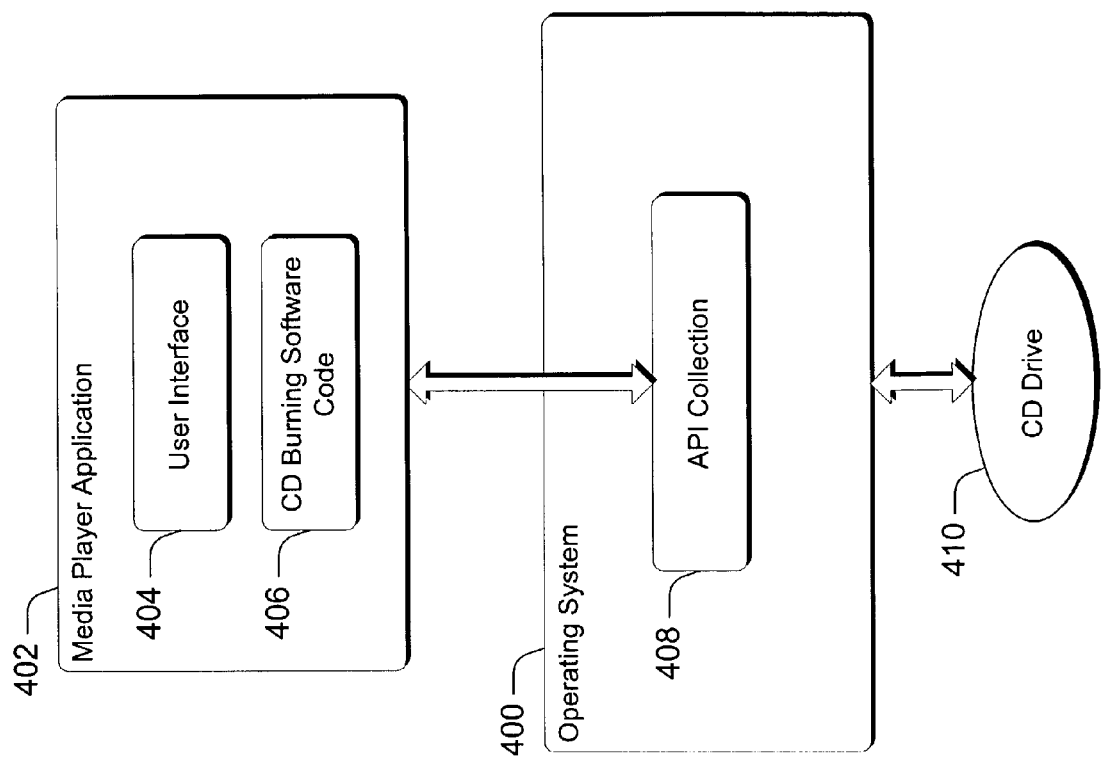
FIG. 4 is a block diagram that illustrates components of a computer architecture in accordance with one embodiment.

It is to be appreciated that the above-described architecture need not be limited to one that includes, as part of the operating system, a media player application. Rather, the API collection 308 can be called by media player applications that do not comprise an integral part of the operating system. Such a system is illustrated in FIG. 4, where like numerals from the FIG. 3 embodiment have been utilized, where appropriate, except that the "3XX" format has been replaced with the "4XX" format. There, a media player application 402 is not included within the operating system 400. The API collection 408 can still, however, be utilized by making operating system calls from media player application 402 to API collection 408.

In the IMAPI system, the following interfaces can be called to facilitate the CD burning process and provide a tightly-integrated user experience.

| Interface | Description |
| --- | --- |
| IDiscMaster | Enumerates recorders supported by the system, i.e. discovers the disc-burning capabilities; sets the active recorder and format; registers progress callback information; records a disc. |
| IDiscRecorder | Queries disc type and available space; gets and sets recorder properties. |
| IRedbookDiscMaster | Adds data to staging area. |
| IDiscMasterProgressEvents | Displays progress |

Exemplary User Interface and Burn Process

The following discussion provides but one example of a graphical user interface that can be provided in order to help a user burn CDs from within a media player application. Various features of the user interface provide a highly desirable advantage over past methods and approaches. For example, the illustrated and described user interface can enable users to work within one task area to burn CDs, manage files on portable devices, and move or transcode files to portable devices. Since these tasks are quite similar in workflow, they can be combined into one task area.

Figure 5:
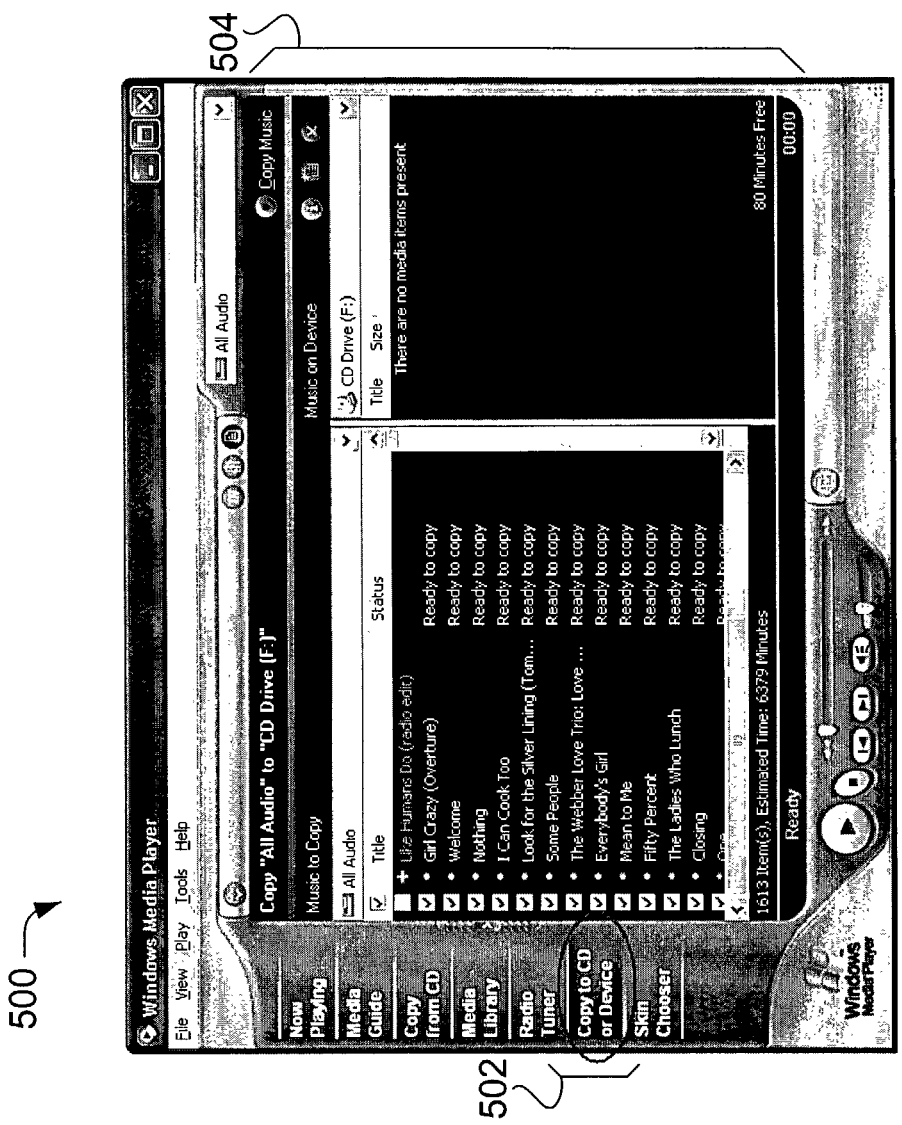
FIG. 5 is a diagram that illustrates an exemplary user interface in accordance with one embodiment.

FIG. 5 shows an exemplary user interface 500 that can be used by a user to burn CDs. When the user decides that they wish to burn a CD, they can click on a "Copy to CD or Device" task button 502. Doing do presents to the user a "Copy to CD or Device" pane 504. In the IMAPI context, the interface that is called is the IDiscMaster interface to enumerate the recorders.

Notice, in the left side of pane 504, a list of songs that can be burned appears for the user. In this example, these songs reside as files in the user's own media library which is resident on their computer. Tight integration of the media player application with the burning functionality provides an advantage in that the user need not know where their songs are located on their device. The media player application already knows where their songs are located. Accordingly, when the user clicks on task button 502, the media player application will automatically list the songs that are in their media library. In the illustrated example, columns are provided for the song titles and status of the burn. The "Status" column provides a user with dynamic feedback, on a title-by-title basis, on the status of their CD burning process, as will become apparent below. To initiate the burning process after the appropriate songs and device to which the songs are to be copied have been selected, the user need simply click on the "Copy Music" button that appears in the upper right portion of pane 504.

Figure 6:
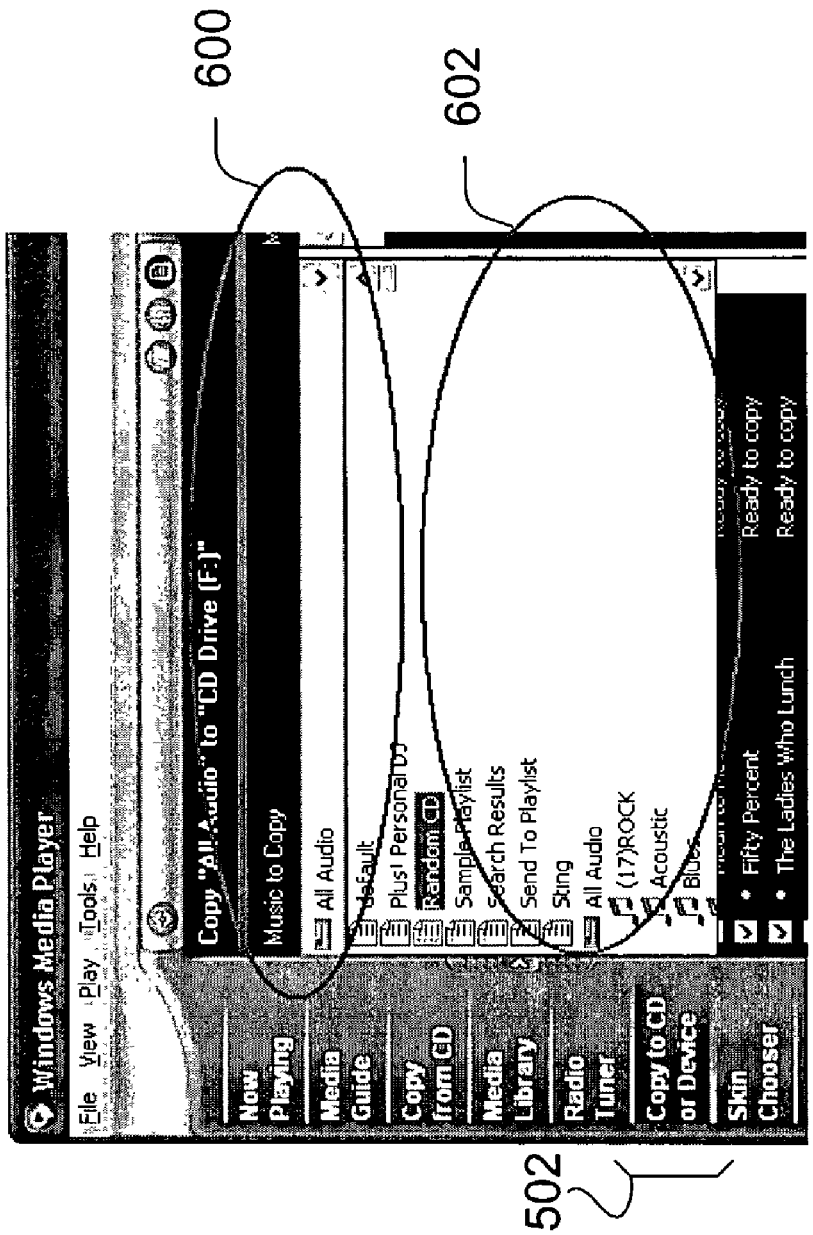
FIG. 6 is a diagram that illustrates a portion of the FIG. 5 user interface in accordance with one embodiment.

Consider, for example, FIG. 6 which shows an enlarged portion of the FIG. 5 user interface. Using this portion of the user interface, the user can choose which content they want to burn to the CD by clicking the "Music to Copy" dropdown menu 600, and by selecting a playlist or group of tracks. Notice also that the drop down menu provides a list 602 of the media content library that can include playlists, track groups by genre, and individual songs. It should be appreciated that other methods can be used by the user to choose music to burn. For example, the user can drag and drop files from the illustrated shell, or they can use the context menu item in the shell of "Copy to Audio CD" to add files to this list.

Figure 7:
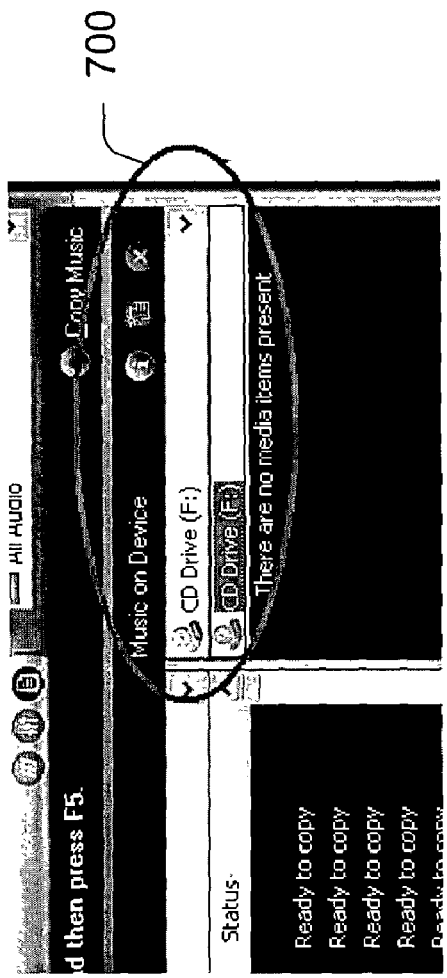
FIG. 7 is a diagram that illustrates a portion of the FIG. 5 user interface in accordance with one embodiment.

The right side of pane 504 provides a drop down menu that enables the user to select a particular device to which the songs are to be copied. As an example, consider FIG. 7. There, the user can choose a burning device by clicking the "Music on Device" dropdown 700, and selecting from a list of installed burners and portable devices. Note that this pane can also be used for transferring music to portable devices. If the user only has a burner installed and no other devices, then the burner will be the default selection and no choice is necessary. In the IMAPI context, the interface that is called is the IDiscMaster interface to set the active recorder and format.

Figure 8:
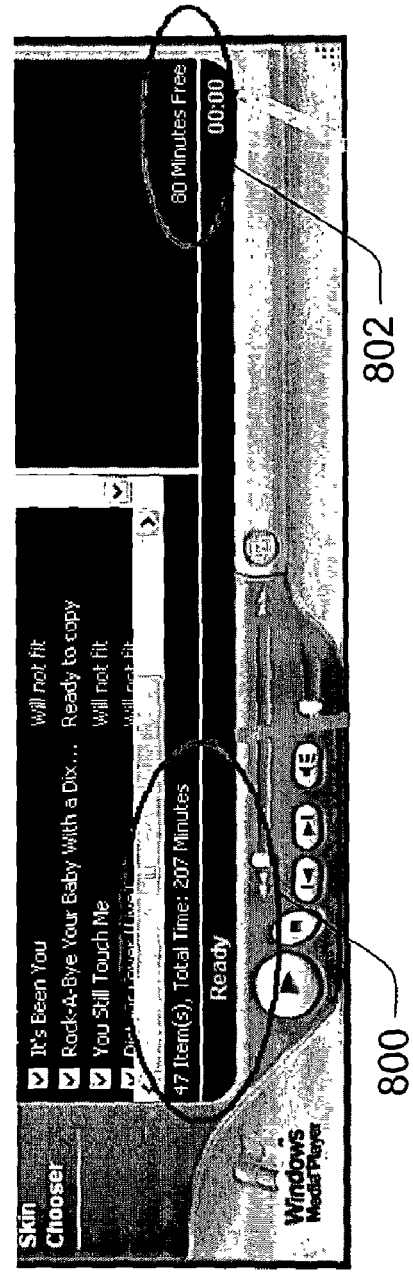
FIG. 8 is a diagram that illustrates a portion of the FIG. 5 user interface in accordance with one embodiment.

Once the user has selected the music to copy and the destination device or burner, they can insert a blank CD (e.g. a blank CD-R or RW). In the illustrated and described embodiment, the total time available on that blank CD will be shown on the "Music on Device" side of the user interface. Additionally, the total time of all selected tracks can also be shown on the "Music to Copy" side of the user interface. This provides the user with an instant appreciation for the length of the titles that they have selected and whether there is enough room on the destination CD. As an example, consider FIG. 8 which is an enlarged portion of the FIG. 5 user interface. There, a portion 800 of the user interface provides an indication of the total time of all of the selected tracks as well as an indication of the number of tracks selected. In this example, the user has selected 47 items for a total time of 207 minutes. Another portion 802 of the user interface indicates that the blank disc that the user has inserted has 80 minutes free. Thus, in this example, the user has immediate feedback that the total time of the tracks they have selected exceeds the capacity of the disc slated for burning. In the IMAPI context, the interface that is called is the IDiscRecorder interface for querying the disc type and available space.

Figure 9:
FIG. 9 is a diagram that illustrates a portion of the FIG. 5 user interface in accordance with one embodiment.

Another advantageous feature of the illustrated and described embodiment is that the user can be given, via the user interface, an opportunity to select and deselect tracks for burning. As an example, consider FIG. 9.

There, the user can select/deselect and reorder tracks as necessary to determine what tracks will be copied to the CD. The media player clearly shows the user what tracks will and will not fit on the blank CD. The user can re-order the tracks by dragging and dropping, or by choosing "Move Up" and "Move Down" on the context menu. The user selects and deselects tracks by clicking on the checkbox next to the track name. Even if a user selects a track that will not fit on the CD, the media player will not interrupt the process with errors. Rather, the track will simply just not be copied onto the CD.

Once the tracks are selected and the user has satisfied themselves that there is enough room on the CD to hold their selections, they can simply click on the "Copy Music" button at the top right hand side of pane 504 (FIG. 5). In the IMAPI context, the interface that is called is the IDiscMaster interface to register progress callback information.

Figure 10:
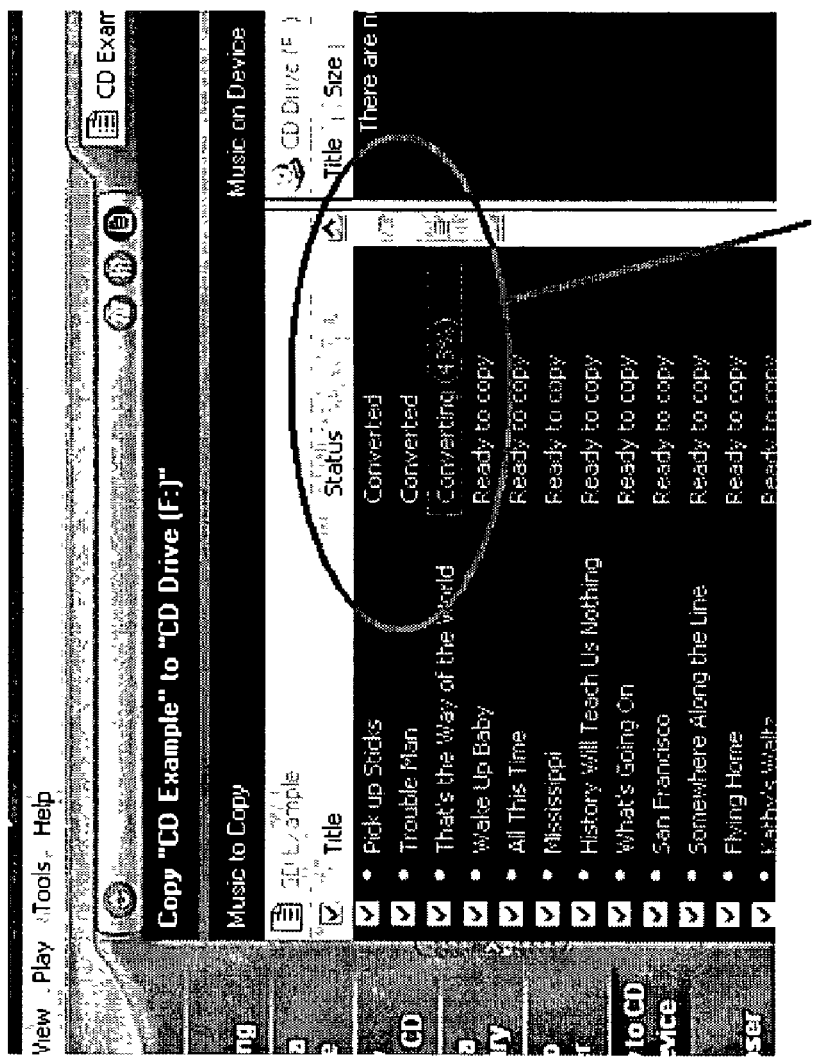
FIG. 10 is a diagram that illustrates a portion of the FIG. 5 user interface in accordance with one embodiment.

One of the advantageous features of the illustrated and described embodiment is that the media player application can automatically transcode all files to PCM Audio. Transcoding of the files involves converting the digital media format of the file to a format that can be burned to an audio CD. When the user selects particular files, the media player application can ascertain its present media format that then convert it to the appropriate format for burning. This can typically involve resampling the data to ensure that it conforms to the PCM sampling rate. This converted data can then be provided to the appropriate API for processing. The user can be provided, via the user interface, dynamic information associated with the transcoding process. As an example, consider FIG. 10.

There, a portion of the user interface is shown that provides the user with feedback that shows the progression of tracks that have been transcoded. Here, the first two tracks—"Pick Up Sticks" and "Trouble Man"—have already been transcoded. The track "That's the Way of the World" is in the process of being transcoded and is presently 43% transcoded.

Another advantageous feature of the illustrated and described embodiment is that the media player application can handle digital rights management (DRM) issues associated with the particular tracks that a user has designated for burning. For example, it is fairly common for the rights holder of a particular piece of content to specify various protections that are associated with that content. Specifically, one of the rights that can be specified for a piece of content is whether or not the content can be burned to an audio CD or otherwise copied. In accordance with this embodiment, the media player application includes logic that checks as to whether the designated content can be burned or not. If the DRM data (i.e. a license) associated with a particular piece of content indicates that it cannot be burned to a CD, the media player application will not allow it to be burned. If, on the other hand, the DRM data indicates that there is no restriction against burning to a CD, then the media player application will typically unencrypt the file, transcode it if necessary, and burn it to the CD.

Figure 11:
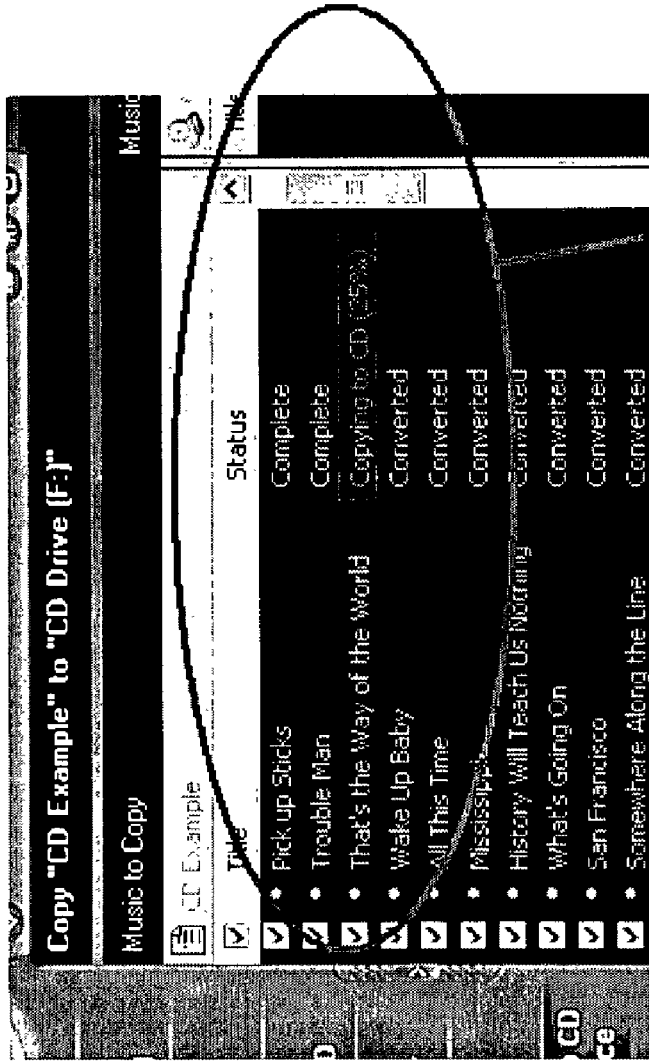
FIG. 11 is a diagram that illustrates a portion of the FIG. 5 user interface in accordance with one embodiment.

Another advantageous feature of the present embodiment is that the user can be informed on the progression of the CD burning process itself. As an example, consider FIG. 11.

There, a portion of the user interface provides the user with information that indicates which tracks have been transcoded, which tracks have been copied, and which track is currently being copied. In this example, the first two tracks—"Pick Up Sticks" and "Trouble Man"—have already been copied or burned to the CD. The track "That's the Way of the World" is in the process of being copied and is presently 25% copied. In the IMAPI context, the interfaces that are called during this process are the IRedbookDiscMaster interface to add data to a staging area, the IDiscMaster interface to record a disc, and the IDiscMasterProgressEvents interface to display the progress of the burn.

Figure 12:
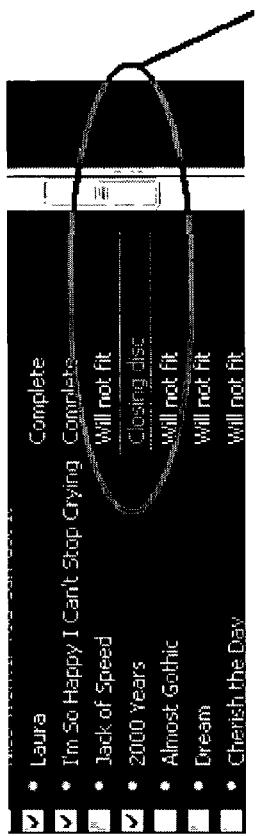
FIG. 12 is a diagram that illustrates a portion of the FIG. 5 user interface in accordance with one embodiment.

After all of the tracks have been copied to the disc, the disc is completed by being closed. The user interface can provide the user with information that indicates that this is being or has been done. As an example, consider FIG. 12. There, the user interface indicates that the disc is being closed.

Developing Metadata for Burned CD

Figure 13:
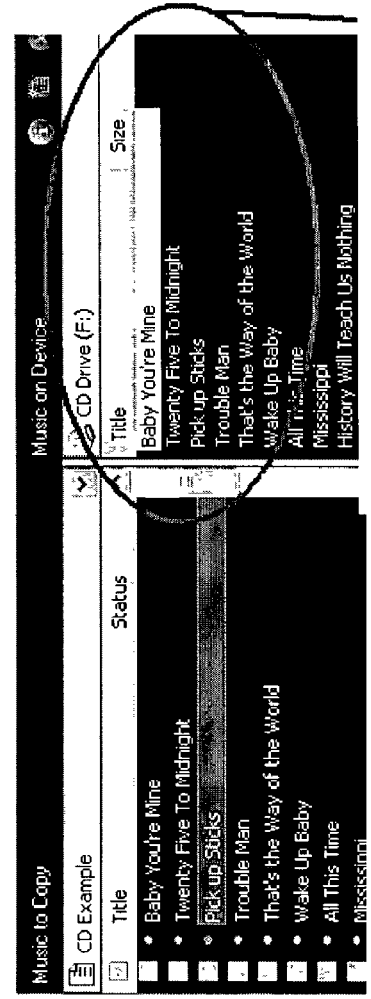
FIG. 13 is a diagram that illustrates a portion of the FIG. 5 user interface in accordance with one embodiment.

Another advantageous feature of the presently-described embodiment is that metadata pertaining to the newly burned CD can be developed and associated with the CD so that when it is played by a suitably configured media player, the metadata can be made available for the user. Any suitable metadata can be developed and associated with the CD. In the present example, the media player application can develop a table of contents or "TOC" that is then associated with the CD. As an example, consider FIG. 13. There, the media player application retrieves the table of contents for the completed CD, and saves that in the media player library database, along with the metadata information for that CD. Every time the user plays that CD in the same computer, the media player will recognize it, and provide a good playback experience by showing correct track/title information.

Burner Configuration User Interface/Media Player Button to Launch

Figure 14:
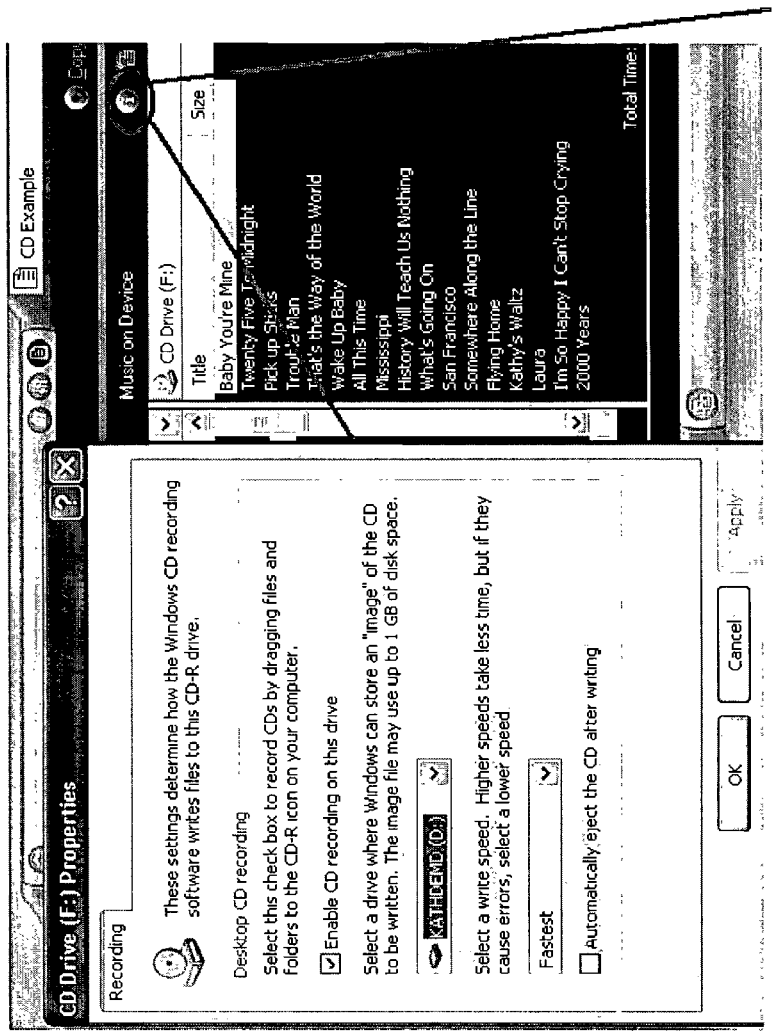
FIG. 14 is a diagram that illustrates a portion of the FIG. 5 user interface in accordance with one embodiment.

In accordance with another embodiment, the media player application can also provide the user with a way to configure the settings on their CD burner. As an example, consider FIG. 14. There, in the "Copy to CD" pane, there is a button that launches a recorder property page that enables the user to configure their burner and its settings. In the IMAPI context, the interface that is called is the IDiscRecorder interface to get and set recorder properties.

Different Types of Data

In accordance with one embodiment, different types of data can be handled by the above-described system. As an example, consider the following.

For a typical audio CD, the data that gets burned onto the CD comprises what is known as Redbook audio data. Advantageously, other types of data can be handled by the above-described system. One such type of data is that which is typically provided onto a data CD, e.g. data within compressed files such as an MP3 file. Data CDs do not typically play in consumer audio players but rather contain a different type of data. Another such type of different data is called WM CD.

Exemplary Method

Figure 15:
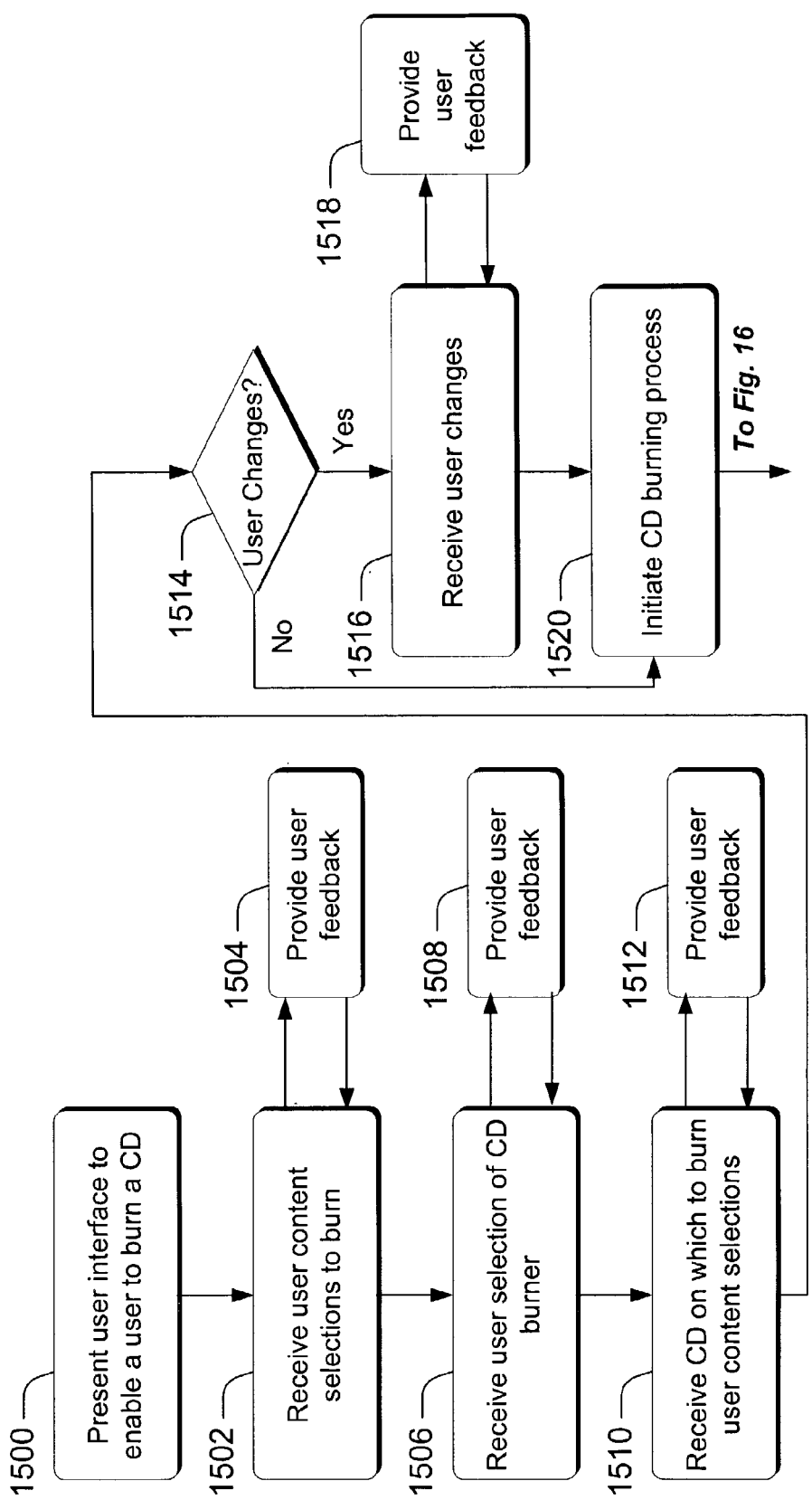
FIG. 15 is a flow diagram that illustrates steps in a method accordance with one embodiment.

FIG. 15 is a flow diagram that describes steps in a method in accordance with one embodiment. The method can be implemented in any suitable hardware, software, firmware or combination thereof In the illustrated and described embodiment, the method can be implemented, at least in part, by a suitably configured media player application. Such media player application can comprise part of an operating system. Alternately, the media player application need not comprise part of an operating system.

Step 1500 presents a user interface to enable a user to burn a CD. An exemplary user interface is shown and described above. As noted above, the user interface comprises part of a media player application that enables not only media to be played and managed, but for digital data to be burned to a CD. In the illustrated and described embodiment, the user interface advantageously can present a single pane from which the user can access content stored on their computer, select various content for burning, and receive various feedback throughout the burning process-without ever having to leave the single pane. This is most advantageous over past systems that simply used a media player to launch a third party application for a number of reasons, not the least of which pertains to the extent to which the user's burning experience can be enhanced. That is, by tightly integrating the media player application with the CD burning functionality, a robust collection of services can be provided to the user such as the various feedback that is provided to the user throughout the burning process. Additionally, the user can be alleviated of the burden of knowing where their music or data files reside on their computer because the media player application already keeps track of this information. Thus, if the user launches their media player application they can immediately access its CD burning functionality by simply clicking on the appropriate task button. The application then presents a list of the user's songs or file directories so that the user can quickly make their selections.

Step 1502 receives user content selections that the user wishes to burn. An exemplary way in which this step can be implemented is described above in connection with FIGS. 5 and 6. Step 1504 can provide the user with feedback as the user makes their selections. For example, as the user selects tracks for burning, they can be provided with immediate feedback as to the total length in playing time of the selected tracks. Additionally, if a CD is loaded in the CD drive, the user can receive feedback pertaining to the amount of available time on the CD. With these two pieces of information, the user can immediately know whether the tracks they have selected exceed the capacity of the selected disc. Additional feedback can include the status of the CD burning process. For example, as noted in FIG. 5, each of the tracks in the user's library has an associated status field which informs the user, on a track-by-track basis, on the status of the CD burning process.

Step 1506 receives a user selection of a CD burner and step 1508 provides the user with feedback. In the illustrated and described embodiment, this step can be implemented within the single pane mentioned above. If there is only one CD burner on the user's computer or device to which tracks can be copied, then this step is essentially a default step in that the device is selected. If, on the other hand, there are multiple devices to which tracks can be copied-such as a handheld and a CD burner, then the user can, via a drop down menu, select an appropriate device. Thus, user feedback is provided to the user via the dropdown menu. In this example, since the user desires to burn a CD, they would select the CD burner.

This step also illustrates one of the advantages of having the media player and the burning functionality tightly integrated. Specifically, by virtue of the tight association between the media player application and the CD burner, the media player will automatically know which devices are registered with the system. Thus, if the user's computer does not support a CD burner, then this functionality will not be offered to the user. If the user's computer does support a CD burner, then the media player will know this and will thus enable the user to select this functionality. Thus, the user can be provided with feedback in the event that there are no devices to which tracks can be copied.

Step 1510 receives a CD on which to burn the user's content selections and step 1512 provides the user with feedback. Although this step is designated as appearing at this particular location in the process flow, it can really occur at any point before burning actually starts. Examples of the feedback that can be provided are given above and include such things as total available time for recording on the CD.

Step 1514 determines whether there are any user changes. Changes can include such things as changing track selections, track order for burning and the like. This step illustrates one of the advantages that providing user feedback embodies. Specifically, by virtue of the fact that the user is provided with feedback concerning the total length of the selected tracks and the available recording time on the CD, the user can instantaneously know whether their selections exceed the disc's capacity. If their selections exceed the disc's capacity, then they can simply de-select tracks or otherwise change their selections so that their selections do not exceed the disc's capacity. An example of this is set forth and discussed in connection with FIG. 9 above. There, several of the tracks selected by the user are designated in the status column as "Will not fit". Accordingly, the user can use this feedback to change or otherwise arrange their selections so that the selections will indeed fit before burning begins.

If there are no changes, then the method can proceed to step 1520 for initiating the burning process. If, on the other hand, there are user changes, step 1516 receives the user changes and step 1518 provides user feedback. These two steps can effectively iterate until the user arrives at their desired selections.

Figure 16:
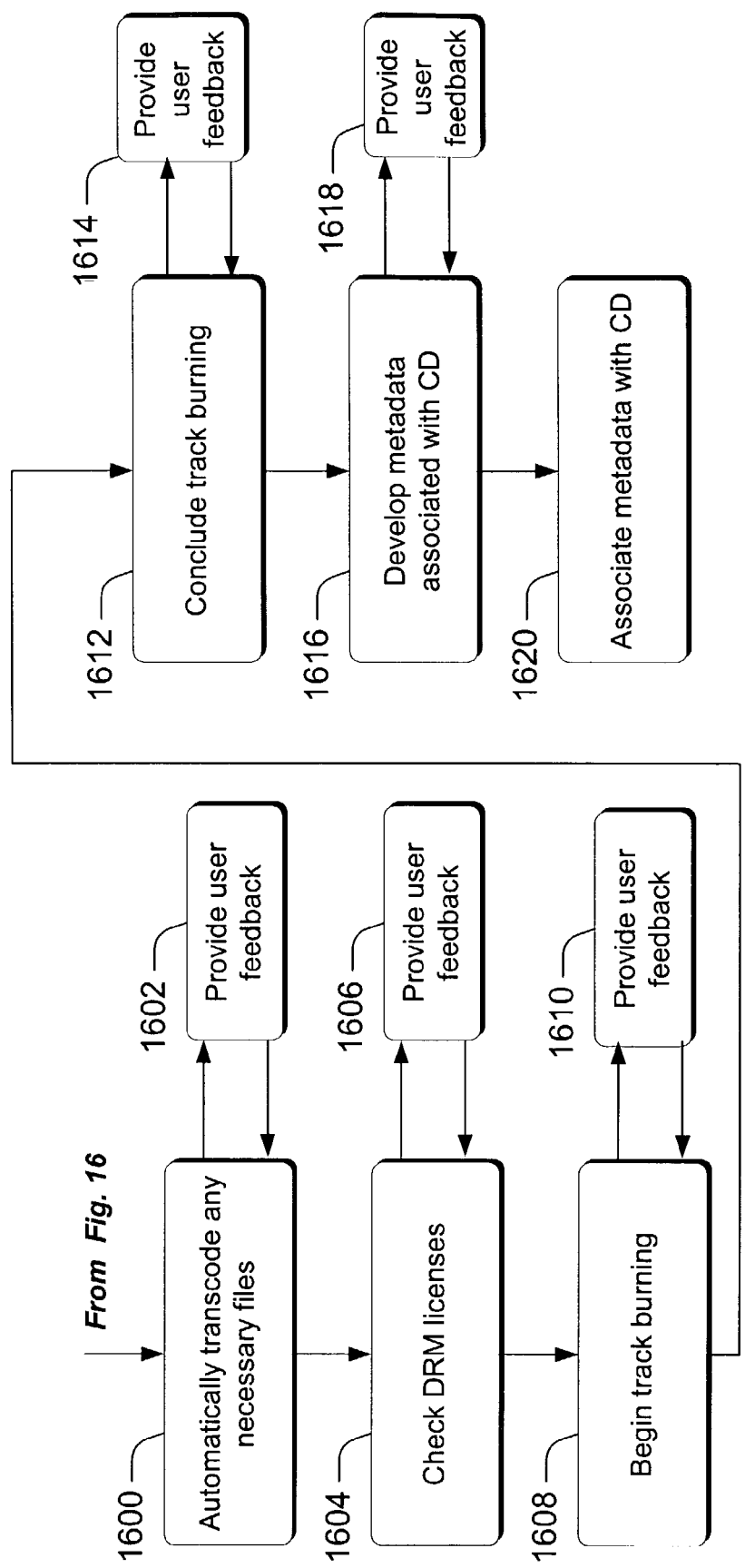
FIG. 16 is a flow diagram that illustrates steps in a method accordance with one embodiment.

Step 1520 initiates the burning process. In the illustrated and described embodiment, initiation of the burning process need not necessarily begin with the act of physically burning the data to the CD—although there is no reason why it cannot. Rather, several of the embodiments can provide additional processing steps as part of the burning initiation process. Examples of these additional processing steps are shown and described in connection with FIG. 16.

Step 1600 automatically transcodes any necessary files and step 1602 provides user feedback relative to the transcoding process. Transcoding is discussed above in connection with FIG. 10. Step 1604 checks any DRM licenses to ensure that tracks that are restricted from copying are not copied to the CD. Step 1606 provides user feedback relative to the DRM process. For example, in an event that a selected track is restricted from copying by a DRM license, the user can be informed that this particular track cannot be burned.

Step 1608 begins the track burning process and step 1610 provides user feedback relative to the track burning process. An example of this step is shown and described in connection with FIG. 11. The feedback that is provided includes track-by-track feedback on the progression of the burning process. The feedback can also include, relative to each track, the percentage of the completeness of the burn. For example, in FIG. 11, the burn of the track "That's the Way of the World" is shown to be 25% complete.

Step 1612 concludes the tracking burning process and step 1614 provides user feedback. An example of these steps is given above in connection with FIG. 12. Step 1616 develops metadata associated with the burned CD and step 1618 provides user feedback relative to the development of the metadata. An example of these steps is given above in connection with FIG. 13. Step 1620 then associates the metadata with the CD. This step can be accomplished in any suitable way. For example, the metadata can include a table of contents for the CD and such table of contents can be associated with the CD via the user's media library such that any time the user plays that particular CD on their computer, they can have access to the table of contents.

Other Features

In the discussion above, the examples pertain to burning data to the CD in the Redbook audio format. This need not, however, be the only type or format of data that can be burned to the CD using the inventive embodiments above. Rather, compressed files can be burned to the CD as well. For example, compressed audio files can be burned to the CD. Accordingly, the user can provide more content on the CD than would otherwise be possible if the files were not compressed. Hence, a suitably configured CD player can then uncompress the files and play the content for the user.

Further, various embodiments discussed above can support playlists in a manner that can greatly enhance the user's experience. Specifically, when the user burns their files to the CD, the user can also burn a playlist associated with the files to the CD as well. Accordingly, if the user takes the CD to another computer or a device that understands that playlist format, they can play their music in the order that they want and take advantage of the services that the playlist can provide. Examples of playlists and related services using playlists are described in U.S. patent application Ser. No. 10/103,526, entitled "Methods and Systems For Processing Playlists", filed on Mar. 21, 2002, and incorporated by reference herein.

Additionally, in some embodiments, the user has the ability to tell the system that it wants to take all of the music in the media library and transcode it to a particular bit rate on a data CD. This can allow the user, for example, to copy music that resides on the hard drive at a very high bit rate to a CD at a lower bit rate. The advantage of doing this is that user can provide more of their songs onto the CD.

Further, another feature of some of the embodiments is that normalization processing can be done. That is, if a particular sound track is too loud, then the track can be normalized so that when played, it is not so loud.

CONCLUSION

The various embodiments discussed above can greatly enhance a user's CD burning experience. In some embodiments, the user's convenience is enhanced by providing a single user interface pane that gives the user the opportunity to access, organize, and manage their tracks. In addition, in the single pane and other embodiments, user feedback is provided at various stages of the burning process thus providing the user with meaningful, timely and useful information. Further, integration of CD burning capabilities into a media player application mitigates most if not all of the problems associated with the previous approaches that utilized a third party burning application.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
   a memory;
   one or more processors coupled to the memory;
   a media player application comprising a CD burner component, the media player application embodied in an operating system that:
   enables CDs to be played on a computing device;
   makes application program interface (API) calls to facilitate CD burning;
   determines a total time available on a CD for storing music;
   determines a total time for all selected tracks prior to CD burning;
   provides a notification prior to CD burning if the total time available on the CD is less than the total time for all selected tracks;
   determines a media format of a file;
   when the file is an audio file, automatically transcodes the file to a pulse code modulation (PCM) format to enable the file to be burned to an audio CD;
   creates metadata that includes a table of contents and associates, in the memory, the metadata with the audio CD;
   determines a current status indicator for each file from a plurality of current status indicators, the plurality of current status indicators being complete, copying, ready to copy, will not fit, and converted; and
   determines if the file is associated with a valid DRM license;
   a collection of APIs embodied in the operating system that can be called by the CD burner component to facilitate CD burning; and a single pane user interface for the media player application enabling a user to perform CD burning, displaying a plurality of files concurrently, managing one or more the files on a portable device, and move or transcode the one or more plurality of files to the portable device.

2. The system of claim 1, wherein the APIs include an interface for enumerating devices supported by the system.

3. The system of claim 1, wherein the APIs include an interface for discovering disc-burning capabilities of the system.

4. The system of claim 1, wherein the APIs include an interface for setting an active burner and format.

5. The system of claim 1, wherein the APIs include an interface for registering progress callback information.

6. The system of claim 1, wherein the APIs include an interface for burning a disc.

7. The system of claim 1, wherein the APIs include an interface for querying a disc type and available space.

8. The system of claim 1, wherein the APIs include an interface for retrieving and setting recorder properties.

9. The system of claim 1, wherein the APIs include an interface for adding data to a staging area.

10. The system of claim 1, wherein the APIs include an interface for displaying disc burning progress.

11. The system of claim 1, wherein the media player application is configured to enable burning of data other than Redbook audio data.

12. A system comprising:
a memory;
one or more processors coupled to the memory; and
a media player application embodied in an operating system, the media player application executable by the one or more processors to display a single pane user interface enabling a user to perform CD burning, the single pane user interface displaying a plurality of files concurrently to facilitate transferring one or more of the plurality of files to and from a portable device, the media player application configured to enable CDs to be played on a computing device, the media player application comprising a CD burner component that is configured to automatically transcode an audio file to a pulse code modulation (PCM) format from a non-PCM format, to make application program interface (API) calls to facilitate CD burning, to create metadata including a table of contents, and to associate, in the memory, the metadata with a burned CD,
the media player application executable by the one or more processors to call an API for displaying disc burning progress that is viewable on the single pane user interface.

13. The system of claim 12, wherein the media player application can make an API call for enumerating devices supported by the system.

14. The system of claim 12, wherein the media player application can make an API call for discovering disc-burning capabilities of the system.

15. The system of claim 12, wherein the media player application can make an API call for registering progress callback information.

16. The system of claim 12, wherein the media player application can make an API call for burning a disc.

17. The system of claim 12, wherein the media player application can make an API call for querying a disc type and available space.

18. The system of claim 12, wherein the media player application can make an API call for retrieving and setting recorder properties.

19. The system of claim 12, wherein the media player application can make an API call for adding data to a staging area.

20. The system of claim 12 further comprising a CD burner for burning CDs.

21. The system of claim 12, wherein the media player application is configured to enable burning of data other than Redbook audio data.

22. A system comprising:
a media player application configured to enable CDs to be played on a computing device;
the media player application comprising a CD burner component that is configured to facilitate CD burning;
the media player application comprising a user interface component that is configured to present a single pane to enable a user to select options for listening to CDs and for burning CDs; and
a collection of application programming interfaces (APIs) executable by the CD burner component to automatically transcode an audio file to a pulse code modulation (PCM) sampling rate by re-sampling the audio file to enable burning the file to an audio CD, to create metadata that includes a table of contents, and to associate, in the media player application, the metadata with a CD after burning the CD;
wherein the APIs include an interface for querying a disc type and available space.

23. The system of claim 22, wherein the media player application and the collection of APIs are embodied in an operating system.

24. The system of claim 22, wherein the collection of APIs is embodied in an operating system.

25. The system of claim 22, wherein the APIs include an interface for enumerating devices supported by the system.

26. The system of claim 22, wherein the APIs include an interface for discovering disc-burning capabilities of the system.

27. The system of claim 22, wherein the APIs include an interface for setting an active burner and format.

28. The system of claim 22, wherein the APIs include an interface for registering progress callback information.

29. The system of claim 22, wherein the APIs include an interface for burning a disc.

30. The system of claim 22, wherein the APIs include an interface for retrieving and setting recorder properties.

31. The system of claim 22, wherein the APIs include an interface for adding data to a staging area.

32. The system of claim 22, wherein the APIs include an interface for displaying disc burning progress.

33. The system of claim 22 further comprising a CD burner for burning CDs.

34. The system of claim 22, wherein the media player application is configured to develop metadata associated with a CD that has been burned and associate the metadata with the CD.

35. The system of claim 22, wherein the media player application is configured to develop metadata associated with a CD that has been burned and associate the metadata with the CD, the metadata comprising a table of contents.

36. The system of claim 22, wherein the media player application is configured to enable burning of data other than Redbook audio data.

37. A computing device embodying the system of claim 22.

38. A method comprising:
presenting a single pane user interface via a media player application comprising a CD burner component;

receiving user input via the single pane user interface to initiate burning a CD; and responsive to receiving the user input, making one or more application program interface (API) calls to burn the CD, the act of making the one or more API calls including:

a first API call to determine whether a format of a file selected by a user for burning to the CD is a pulse code modulation (PCM) format;

a second API call to transcode the file to the PCM format in response to determining that the format of the file is not the PCM format;

a third API call to create metadata including a table of contents of the CD and to associate, in the media player application, the metadata with the CD after burning the CD;

a fourth API call to display a disc burning progress in the single pane user interface.

39. The method of claim 38, wherein the act of making the one or more API calls comprises calling an interface for enumerating devices supported by a system.

40. The method of claim 38, wherein the act of making the one or more API calls comprises calling an interface for discovering disc-burning capabilities of a system.

41. The method of claim 38, wherein the act of making the one or more API calls comprises calling an interface for setting an active burner and format.

42. The method of claim 38, wherein the act of making the one or more API calls comprises calling an interface for registering progress callback information.

43. The method of claim 38, wherein the act of making the one or more API calls comprises calling an interface for burning a disc.

44. The method of claim 38, wherein the act of making the one or more API calls comprises calling an interface for querying a disc type and available space.

45. The method of claim 38, wherein the act of making the one or more API calls comprises calling an interface for retrieving and setting recorder properties.

46. The method of claim 38, wherein the act of making the one or more API calls comprises calling an interface for adding data to a staging area.

47. One or more computer-readable media having computer-readable instructions thereon which, when executed by one or more processors, cause the one or more processors to implement the method of claim 38.

48. A method comprising:

presenting a media player application user interface via a media player application comprising a CD burner component, the user interface comprising a single pane from which a user can select options for listening to CDs and for burning CDs;

receiving user input via the media player application user interface to initiate burning a CD;

responsive to receiving the user input, making one or more application program interface (API) calls to burn the CD, the one or more API calls embodied in an operating system;

transcoding one or more files selected by the user to a pulse code modulation (PCM) format when the CD comprises an audio CD;

displaying disc burning progress via the one or more API calls; and associating, in the media player application, metadata with the CD after burning the CD, the metadata including a table of contents of the CD.

49. The method of claim 48, wherein the act of making the one or more API calls comprises calling an interface for enumerating devices supported by a system.

50. The method of claim 48, wherein the act of making the one or more API calls comprises calling an interface for discovering disc-burning capabilities of a system.

51. The method of claim 48, wherein the act of making the one or more API calls comprises calling an interface for setting an active burner and format.

52. The method of claim 48, wherein the act of making the one or more API calls comprises calling an interface for registering progress callback information.

53. The method of claim 48, wherein the act of making the one or more API calls comprises calling an interface for burning a disc.

54. The method of claim 48, wherein the act of making the one or more API calls comprises calling an interface for querying a disc type and available space.

55. The method of claim 48, wherein the act of making the one or more API calls comprises calling an interface for retrieving and setting recorder properties.

56. The method of claim 48, wherein the act of making the one or more API calls comprises calling an interface for adding data to a staging area.

57. One or more computer-readable media having computer-readable instructions thereon which, when executed by one or more processors, cause the one or more processors to implement the method of claim 48.

\* \* \* \* \*